Dec. 3, 1957 W. T. PICKAVANCE 2,815,039
MILK LINE NIPPLE PROTECTOR
Filed May 17, 1954
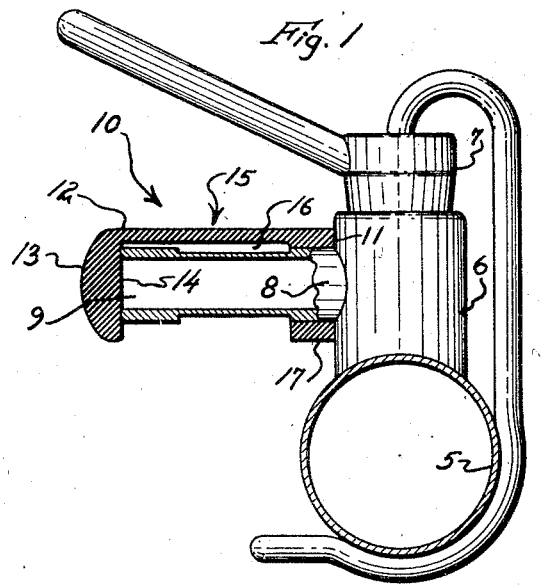
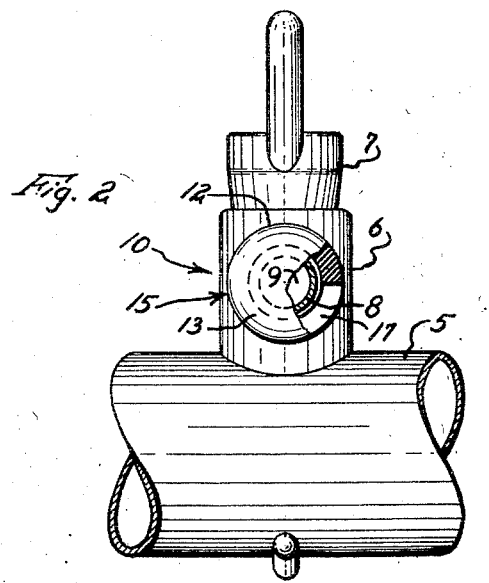
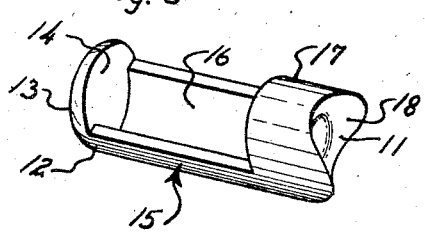
INVENTOR
WILLIAM T. PICKAVANCE
BY Williamson, Williamson,
Schroeder & Adams
ATTORNEYS United States Patent Office 2,815,039
Patented Dec. 3, 1957

2,815,039

MILK LINE NIPPLE PROTECTOR

William T. Pickavance, Albert Lea, Minn., assignor to National Cooperatives, Inc., Chicago, Ill., a corporation of the District of Columbia Application May 17, 1954, Serial No. 430,169

4 Claims. (Cl. 137—381)

This invention relates to milk lines used in connection with milking machines. More particularly, it relates to a milk line nipple to which the milk line of a milking machine unit may be attached and to means for precluding contamination at the entrance of the milk line nipple.

It is common usage in the utilization of milking machine units to have a central or main suction line having a plurality of outwardly extending milk line nipples disposed at various points along its length so that individual milking machine units may be used from one location to another and be in operation by merely attaching the milk line of the individual milking unit to the adjacent milk line nipple carried by the main suction line. It is common practice to have a considerably lesser number of milking units than the number of milk line nipples and therefore these milk line nipples are not in use continuously. This is especially true, of course, in view of the fact that the milking operation takes place only two or three times daily and the rest of the time the milk line nipples are unprotected. Unless some means is provided for covering such milk line nipples, dust and dirt and other contaminatory material will enter the open end of the milk line nipple with the result that the milk in the succeeding milking operation will become contaminated. Various means have been designed to minimize this contamination but each of these means has proved either too costly or too bothersome to be practical. Some operators of milking machines carry covering devices with them, but these covering devices when carried in the overall pocket of the milking machine operator become contaminated so that the purpose of the device is defeated. My invention is directed toward obviating these disadvantages.

It is a general object of my invention to provide a novel and improved milk line nipple protector of simple and inexpensive construction and operation.

A more specific object is to provide a milk line nipple protector which may be manufactured inexpensively, which may be readily attached to the milk line nipple, which may be readily moved to a non-covering position, and which will upon release return to nipple protecting position.

Another object is to provide a milk line nipple protector which may remain at all times attached to the milk line nipple whether it is in nipple sealing position or not.

Another object is to provide a milk line nipple protector which will automatically seal the milk line nipple so as to obviate any adverse effects which may result from a leaky spigot.

Another object is to provide a milk line nipple protector which will automatically seal off the milk line nipple upon the detachment of the milking unit line from the milk line nipple.

These and other objects and advantages of my invention will more fully appear from the following description made in connection with the accompanying drawings wherein like reference characters refer to similar parts throughout the several views and in which:

Fig. 1 is a vertical sectional view taken through a main line and showing the spigot and nipple in side elevation and the milk line nipple protector and a portion of the milk line nipple in vertical section;

Fig. 2 is an end elevational view of the milk line nipple protector carried by a milk line nipple with a portion thereof broken away; and Fig. 3 is a perspective view of my milk line nipple protector.

One embodiment of my invention is shown in Figs. 1-3 utilized in conjunction with a main line 5 having a spigot housing 6 extending upwardly therefrom and carrying a spigot 7. Extending laterally from the spigot housing 6 is the milk line nipple 8. As best shown in Fig. 1, the milk line nipple 8 is a metal tubular member having an open end 9.

My milk line nipple protector, as shown, is a tubular member indicated generally as 10 and having an open end portion 11 and a closed end portion 12, the closed portion 13 serving as a cap member for the milk line nipple. This tubular member 10 is preferably formed of elastic and flexible rubber which is sufficiently resilient to cause the entire tubular member to be semi-rigid in nature but readily bendable for the desired purpose. The cap member 13 has a flat sealing surface 14 which seals the open end 9 of the milk line nipple 8 when the protector is properly positioned on the nipple. As best shown in Fig. 1, the tubular member 10 has side wall structure 15 sufficiently thick so as to give the tubular member sufficient resiliency to cause it to swing back into the desired position after being flexed and released.

As best shown in Fig. 3, the side wall structure 15 is cut away from a point immediately adjacent the sealing surface 14 to a point adjacent the open end portion 11 of the tubular member. Only one side of the wall structure is cut away and the opposite side 16 remains intact to support the cap member from the open end portion which becomes a ring member 17 as a result of the cutting away of the side wall structure. The internal diameter of the tubular member 10 is such that the ring member 10 will firmly and frictionally engage the milk line nipple 8 and secure the entire protector to the milk line nipple in a positive manner. The inner or extreme end of the open end portion 11, or in other words of the ring member 17, is concavely shaped as at 18 to conform with the external surface of the spigot housing 6. The length of the side wall structure 16 is such that the sealing surface 14 will thereupon be brought snugly against the open end 9 of the nipple 8 so that the cap member 13 will be held against the open end of the nipple under slight compression. If the device is attached as shown in Fig. 1 the wall structure 16 will be in overhanging relation to the nipple 8 and the cap member will swing outwardly upwardly when it is desired to attach a milking unit line to the milk line nipple 8. When the milking unit line is detached from the milk line nipple 8, the resiliency of the wall portion 16 is sufficient to swing the cap member 13 downwardly so that its sealing surface 14 will close off and seal the open end of the milk line nipple 8. In this manner it is impossible for dirt or other material to enter the otherwise open end of the milk line nipple 8 and contaminate the interior thereof.

In the event the spigot 7 becomes faulty and leaks, the sealing surface 14 will seal off the milk line nipple 8 so as to prevent the entrance of air therethrough and thus there will be no appreciable lack of suction as a result of air entering through the faulty spigot. The cap member 13 being made of relatively soft rubber will readily conform to the end portions of the milk line nipple and will be drawn into tight-fitting sealing relation to the end of the milk line nipple. Thus it can be readily seen that a positive sealing action will be provided by my milk line nipple protector.

One advantage of my invention is that it can be manufactured so simply and inexpensively. Another advantage is that it is highly effective in preventing contamination of the milk line nipple during periods when the nipple is not attached to a milking machine. It can be readily seen that during all periods of non-use of the nipple the open end thereof will be positively protected from contamination by the cap member 13 and by the overhanging wall structure 16 which carries or supports the cap member 13 at its upper edge.

Another advantage of my invention is that it is a simple matter to attach a milking machine unit to the milk line nipple when my protector is used, for the cap member 13 can be readily swung upwardly to non-closing position and the milking machine unit can be attached to the milk line nipple. It is not necessary for the operator of the milking machine unit to first remove a cover member before applying the milking machine unit milk line to the nipple for the cap member 13 can be moved aside readily with the milk line of the milking machine unit, immediately preparatory to attaching the same.

An even more important advantage is the fact that when the milking machine unit is detached from the milk line nipple the cap member 13 will be automatically swung back into sealing position relative to the milk line nipple by the wall structure 16 so that it is not necessary for the operator of the milking machine unit to pause and extract a cover member from his pocket and to replace such a cover member before leaving the location. With my protector he merely needs to pull the milk line off the milk line nipple and pay no further attention to it, being assured that the nipple will be automatically covered and sealed with my protector. It should be noted that the ring member 17 positively and frictionally engages the nipple 8 so as to be fixedly secured thereto. It should also be noted that the intervening wall structure 16 is the portion of the device which readily flexes to permit the cap member 13 to be swung upwardly to non-sealing position.

It will, of course, be understood that various changes may be made in the form, details, arrangement and proportions of the parts without departing from the scope of my invention which consists of the matter shown and described herein and set forth in the appended claims.

What I claim is:

1. A milk line nipple protector comprising an elastic ring member adapted to encircle a milk line nipple adjacent its open end in frictionally engaging relation, an imperforate flexible cap member having a sealing surface adapted to seal off the open end of the nipple when placed thereacross under slight compression and a single, somewhat flexible and resilient support means connecting said cap member at opposite sides thereof adjacent its sealing surface to opposite sides of said ring member and extending continuously therebetween and normally holding said sealing surface under slight compression in nipple-sealing position across the open end of the nipple when said ring member is disposed in proper nipple-engaging position to positively exclude dust therefrom and to seal off the open end thereof against admission of air thereinto, said support means being of sufficient length relative to the length of the nipple to permit said cap member to readily move aside to non-sealing position when it is desired to attach a milk line to the nipple and to automatically swing the sealing surface of said cap member back into nipple-sealing position once the milk line is removed from the nipple, said support means defining an opening between said cap member and said ring member greater than the outer diameter of the nipple, said sealing surface being flat and free of any flange or projection extending toward said ring member.

2. The combination of a milk line nipple having an open end, an elastic ring member encircling said nipple in fixed relation thereto adjacent said open end and frictionally engaging said nipple, an imperforate cap member having a sealing surface adapted to seal off the open end of the nipple when placed thereacross, and flexible resilient support means connecting said cap member to said ring member and defining an opening therebetween greater than the outer diameter of said nipple and normally holding the sealing surface of said cap member across the open end of said nipple in registering relation therewith to cause the same to seal off the open end of said nipple and to positively exclude dust therefrom, said sealing surface of said cap member being flat and free of any flange or projection extending toward said ring member to permit said cap member to be readily moved aside from the open end of said nipple to permit a milk line to be attached to said nipple, said support means being equal in length to the portion of said nipple extending outwardly from said ring member to permit the same to automatically swing said cap member back into nipple-sealing position upon the detachment of the milk line from said nipple.

3. A milk line nipple protector comprising a tubular member having a closed end portion and an open end portion and being formed of flexible resilient rubber and having wall structure sufficiently thick to make said tubular member somewhat semi-rigid, the open end portion of said tubular member being adapted to be slid over the open end of a milk line nipple and to encircle and firmly frictionally engage such a nipple adjacent its open end, the wall structure between said open end portion and said closed end portion being cut away at one side only of said tubular member and defining an opening thereat greater than the outer diameter of the nipple to which said tubular member is to be attached, said closed end portion having a flat interior sealing surface free of any flange or projection extending toward said open end portion and constructed and arranged to engage and seal off the open end of such a milk line nipple when said tubular member is slid on to the nipple, the combined length of the wall structure between said sealing surface and the open end portion of said tubular member being substantially equal to the length of the nipple to which the protector is to be attached, the remaining wall structure opposite said cut-away portion covering approximately half the circumferential surface of the nipple when said tubular member is slid thereon, said remaining wall structure being constructed and arranged to flex and permit said closed end portion to be readily moved aside to non-sealing position relative to the nipple to permit a milk line to be attached to the nipple and to automatically swing said closed end portion and its sealing surface back into nipple-sealing position upon the detachment of the milk line from the nipple.

4. The structure defined in claim 3 wherein the opening-defining area at the end of said open end portion is concavely shaped to conform to the configuration of a milk line nipple supporting spigot.

References Cited in the file of this patent
UNITED STATES PATENTS

| | | |
|---|---|---|
| 1,850,359 | Simmons | Mar. 22, 1932 |
| 2,231,779 | Swartzel | Feb. 11, 1941 |
| 2,600,187 | Bart | June 10, 1952 |
| 2,636,518 | Strebel | Apr. 28, 1953 |